United States Patent
Ghosh et al.

(10) Patent No.: US 11,414,087 B2
(45) Date of Patent: Aug. 16, 2022

(54) METHOD AND SYSTEM FOR PROVIDING PERSONALIZED INTERACTIVE ASSISTANCE IN AN AUTONOMOUS VEHICLE

(71) Applicant: Wipro Limited, Bangalore (IN)

(72) Inventors: Sayanshree Ghosh, Kolkata (IN); Madhumanti Roy, Bangalore (IN); Gourab Mitra, Kolkata (IN)

(73) Assignee: Wipro Limited, Bangalore (IN)

(*) Notice: Subject to any disclaimer, the term of this patent is extended or adjusted under 35 U.S.C. 154(b) by 46 days.

(21) Appl. No.: 16/997,981

(22) Filed: Aug. 20, 2020

(65) Prior Publication Data

US 2021/0370950 A1 Dec. 2, 2021

(30) Foreign Application Priority Data

Jun. 1, 2020 (IN) .............................. 202041022828

(51) Int. Cl.
*B60W 40/08* (2012.01)
*G06N 3/04* (2006.01)
*G06F 9/451* (2018.01)
*B60W 50/12* (2012.01)

(52) U.S. Cl.
CPC ............ *B60W 40/08* (2013.01); *B60W 50/12* (2013.01); *G06F 9/453* (2018.02); *G06N 3/04* (2013.01); *B60W 2040/0818* (2013.01); *B60W 2040/0872* (2013.01)

(58) Field of Classification Search
None
See application file for complete search history.

(56) References Cited

U.S. PATENT DOCUMENTS

| 6,788,768 | B1 | 9/2004 | Saylor et al. |
| 9,747,626 | B2 | 8/2017 | Gormley |
| 2015/0092056 | A1* | 4/2015 | Rau ..................... G06K 9/00791 348/148 |
| 2015/0191176 | A1* | 7/2015 | Kobana .................. B60K 28/06 701/70 |
| 2020/0207358 | A1* | 7/2020 | Katz ....................... G06F 3/017 |

FOREIGN PATENT DOCUMENTS

CN 204341015 U 5/2015

* cited by examiner

*Primary Examiner* — Thomas S McCormack
(74) *Attorney, Agent, or Firm* — Finnegan, Henderson, Farabow, Garrett & Dunner, LLP (57) ABSTRACT

Disclosed herein is method and interactive assistance system for providing personalized assistance to a driver or person in an autonomous vehicle. Parameters related to the user and the vehicle are monitored and compared with historical data to determine a deviation in the parameters. An abnormal condition is detected when the deviation is more than an optimal threshold. Further, a personalized interaction is initiated with the user through a selected one of the interactive assistance engine and one or more assistive activities are performed for handling the abnormal condition. In an embodiment, the method of present disclosure enhances both safety and user experience of the user of the autonomous vehicle.

20 Claims, 4 Drawing Sheets

METHOD AND SYSTEM FOR PROVIDING PERSONALIZED INTERACTIVE ASSISTANCE IN AN AUTONOMOUS VEHICLE

TECHNICAL FIELD

The present subject matter is, in general, related to autonomous vehicles and more particularly, but not exclusively, to method and system for providing personalized interactive assistance in an autonomous vehicle.

BACKGROUND

In the age of Artificial Intelligence (AI), predictive assistance systems have emerged to be the most reliable support systems, especially for autonomous vehicles and intelligent support systems associated the autonomous vehicles. Predictive assistance plays a major role in analyzing driver's health state and predicting an optimal driving condition.

However, the existing predictive assistance systems majorly rely on manual inputs from a user of the autonomous vehicle. For example, the existing predictive assistance systems may be initiated only in response to a user command. Also, presently, the predictions and analysis made by the predictive assistance systems are provided to the user through popup alerts or screen notifications, which require proper attention from the user for taking necessary actions. Consequently, the existing predictive assistance systems pose serious concerns for the user of the autonomous vehicles, specifically when the user has a heath issue while driving the autonomous vehicle and is unable to provide the required manual inputs.

As a result, in the existing systems, the user may find it difficult to activate or notify the predictive assistance system to navigate the autonomous vehicle to a certain destination or to adjust a certain vehicle setting, when the user suffers from an emergency health condition. Also, the existing systems do not provide any mechanism for determining the issue faced by the user or for taking an appropriate corrective measure.

Hence, there is a need for an improved predictive assistance system, which detects an emergency condition associated with the user or the autonomous vehicle during a trip and intelligently takes one or more corrective measures to handle the emergency condition.

The information disclosed in this background of the disclosure section is only for enhancement of understanding of the general background of the invention and should not be taken as an acknowledgement or any form of suggestion that this information forms the prior art already known to a person skilled in the art.

SUMMARY

Disclosed herein is a method of providing personalized interactive assistance in an autonomous vehicle. The method comprises monitoring one or more user parameters related to a user in the autonomous vehicle and one or more vehicle parameters related to the autonomous vehicle. Further, the method comprises determining a deviation in at least one of the one or more user parameters and the one or more vehicle parameters by comparing values of the one or more user parameters and the one or more vehicle parameters with corresponding historical data. Furthermore, the method comprises detecting an abnormal condition when the deviation in at least one of the one or more user parameters and the one or more vehicle parameters is more than a predefined optimal threshold. Once the abnormal condition has been detected, the method comprises initiating a personalized interaction with the user, upon detecting the abnormal condition, through an interactive assistance engine selected based on nature of the abnormal condition. Finally, the method comprises performing one or more assistive activities for handling the abnormal condition, upon receiving a positive acknowledgement from the user during the personalized interaction.

Further, the present disclosure relates to an interactive assistance system for providing personalized interactive assistance in an autonomous vehicle. The interactive assistance system comprises a processor and a memory. The memory is communicatively coupled to the processor and stores processor-executable instructions, which on execution, cause the processor to monitor one or more user parameters related to a user in the autonomous vehicle and one or more vehicle parameters related to the autonomous vehicle. Further, the instructions cause the processor to determine a deviation in at least one of the one or more user parameters and the one or more vehicle parameters by comparing values of the one or more user parameters and the one or more vehicle parameters with corresponding historical data. Thereafter, the instructions cause the processor to detect an abnormal condition when the deviation in at least one of the one or more user parameters and the one or more vehicle parameters is more than a predefined optimal threshold. Furthermore, the instructions cause the processor to initiate a personalized interaction with the user, upon detecting the abnormal condition, through an interactive assistance engine selected based on nature of the abnormal condition. Finally, the instructions cause the processor to perform one or more assistive activities for handling the abnormal condition, upon receiving a positive acknowledgement from the user during the personalized interaction.

Furthermore, the present disclosure relates to a non-transitory computer readable medium including instructions stored thereon that when processed by at least one processor cause an interactive assistance system to perform operations comprising monitoring one or more user parameters related to a user in the autonomous vehicle and one or more vehicle parameters related to the autonomous vehicle. The instructions further cause the interactive assistance system to determine a deviation in at least one of the one or more user parameters and the one or more vehicle parameters by comparing values of the one or more user parameters and the one or more vehicle parameters with corresponding historical data. Thereafter, the instructions cause the interactive assistance system to detect an abnormal condition when the deviation in at least one of the one or more user parameters and the one or more vehicle parameters is more than a predefined optimal threshold. Further, the instructions cause the interactive assistance system to initiate a personalized interaction with the user, upon detecting the abnormal condition, through an interactive assistance engine selected based on nature of the abnormal condition. Finally, the instructions cause the interactive assistance system to perform one or more assistive activities for handling the abnormal condition, upon receiving a positive acknowledgement from the user during the personalized interaction.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to method and interactive assistance system for providing personalized interactive assistance in an autonomous vehicle. In an embodiment, the present disclosure proposes a mechanism for real-time detection of an emergency condition and providing real-time assistance to a user/passenger/driver of the autonomous vehicle based on prediction and cognitive learning to achieve user safety and satisfaction. One of the major elements of the present disclosure is that the interactive assistance system gets activated and/or initiated by itself based on self-monitoring of predetermined deviation factors, without the need of any user intervention. Also, once the interactive assistance system gets initiated, it may not ask for any user confirmation over popup or alert messages displayed on a user interface of the vehicle. Instead, the interactive assistance system may start a voice interaction with the user to formulate a decision about deviations in the monitored deviation parameters.

That is, unlike the existing assistance systems, the proposed interactive assistance system may not seek any user inputs and may activate in-vehicle instructions to perform one or more assistive activities for instantly and effectively addressing the detected emergency condition. The proposed disclosure is to provide a safety support for the user/driver over interactive voice commands, by minimizing and/or without taking manual inputs from the user.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
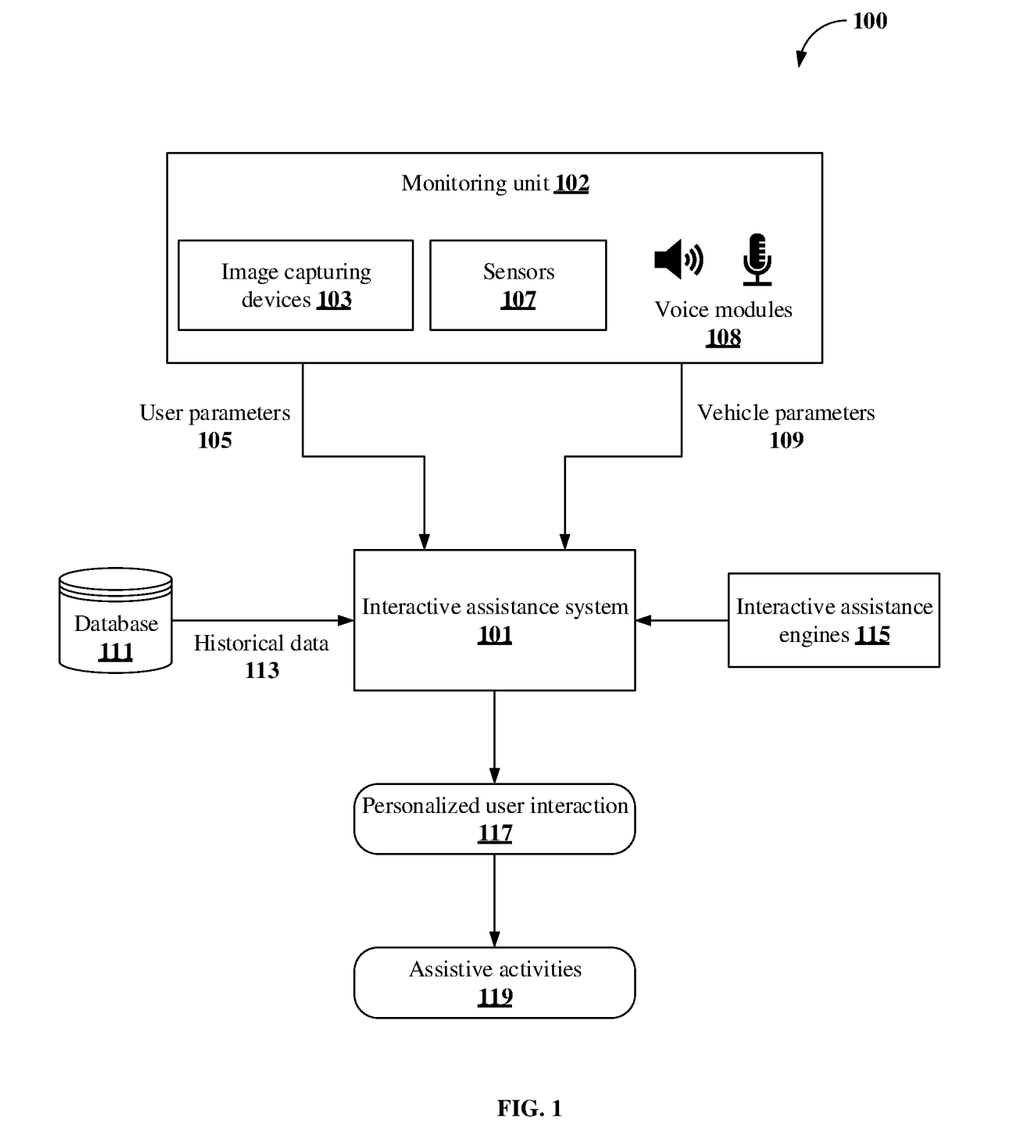
FIG. 1 illustrates an exemplary environment for providing personalized interactive assistance in an autonomous vehicle in accordance with some embodiments of the present disclosure.

FIG. 1 illustrates an exemplary environment 100 for providing personalized interactive assistance in an autonomous vehicle in accordance with some embodiments of the present disclosure.

In an embodiment, the environment 100 may include, without limiting to, an interactive assistance system 101, a monitoring unit 102, a database 111 and a set of interactive assistance engines 115. In an embodiment, the environment 100 may be comparable to a dashboard of an autonomous vehicle. As an example, the autonomous vehicle may be an autonomous car. In an implementation, the monitoring unit 102, the database 111 and the interactive assistance engines 115 may be configured within the interactive assistance system 101, as a part of the interactive assistance system 101.

In an embodiment, the interactive assistance system 101 may be any computing unit that may be configured for providing personalized interactive assistance in the autonomous vehicle. As an example, the interactive assistance system 101 may be configured within an Engine Control Unit (ECU) of the autonomous vehicle. Alternatively, the interactive assistance system 101 may be a stand-alone computing unit, set-up in communication with the ECU of the autonomous vehicle.

In an embodiment, the monitoring unit 102 may include, without limiting to, one or more in-vehicle image capturing devices 103, one or more sensors 107 and voice modules 108. In an embodiment, the one or more image capturing devices 103, such as cameras, may be deployed at predetermined positions/locations inside the autonomous vehicle. The one or more image capturing devices 103 may be configured to capture a plurality of images of the user/driver, ambient surrounding and an external surrounding of the autonomous vehicle, at predetermined intervals. In an embodiment, the plurality of images captured by the one or more image capturing devices 103 may be analysed by the interactive assistance system 101 for collecting and monitoring one or more user parameters 105 and one or more vehicle parameters 109 during a journey/drive on the autonomous vehicle. In an embodiment, the one or more sensors 107 may include, without limiting to, a temperature sensor, a pressure sensor a motion sensor, a proximity sensor and the like. Similar to the one or more image capturing devices 103, the one or more sensors 107 sense and transmit values of the one or more user parameters 105 and the one or more vehicle parameters 109 to the interactive assistance system 101. In an embodiment, the voice modules 108 in the monitoring unit 102 may include, without limiting to, a speaker and a microphone. As an example, using the speaker and the microphone, the interactive assistance system 101 may carry out an interaction with the user/driver of the autonomous vehicle.

In an embodiment, the database 111 may be used for storing historical data 113 related to the user/driver and the autonomous vehicle. As an example, the database 111 may store historical values of the one or more user parameters 105 and the one or more vehicle parameters 109. Further, the historical data 113 stored on the database 111 may be retrieved by the interactive assistance system 101 when a deviation has to be detected in values of the one or more user parameters 105 and the one or more vehicle parameters 109 for determining an abnormal condition associated with the user or the autonomous vehicle.

In an embodiment, the interactive assistance engines 115 associated with the interactive assistance system 101 may include a plurality of Intelligent Virtual Assistant (IVU) or Intelligent Personal Assistant (IPA) tools that perform tasks and activities for the user, based on a voice-based interaction carried out with the user. As an example, the interactive assistance engines 115 configured with the interactive assistance system 101 may include, without limiting to, Apple Siri®, Google Now®, Microsoft Cortona®, Amazon Alexa® and the like. In an embodiment, any other voice assistance tool may be configured with the interactive assistance system 101 according to preferences of the user.

In an embodiment, the interactive assistance system 101 may be configured for monitoring the one or more user parameters 105 and the one or more vehicle parameters 109, which are collected from the monitoring unit 102. As an example, the user parameters 105 measured and/or collected by the monitoring unit 102 may include, without limiting to, an eyeblink rate of the user, steering grip pressure exerted by the user while driving the autonomous vehicle, hand, leg or head movement of the user and other essential and/or health related parameters such as body temperature, blood pressure and a breathing pattern of the user. Similarly, the one or more vehicle parameters 109 may include, without limiting to, engine temperature and ambient temperature in the autonomous vehicle, fuel level in the autonomous vehicle, tyre health status and one or more critical engine parameters associated with the autonomous vehicle. In an embodiment, the interactive assistance system 101 may monitor the one or more user parameters 105 and the one or more vehicle parameters 109 continuously or at predetermined regular intervals such as 30 seconds.

In an embodiment, after the one or more user parameters 105 and the one or more vehicle parameters 109 are monitored, the vehicle assistance system may determine a deviation in the value of at least one of the one or more user parameters 105 and the one or more vehicle parameters 109 by comparing the monitored real-time values of the one or more user parameters 105 and the one or more vehicle parameters 109 with corresponding values comprised in the historical data 113. In an embodiment, when the deviation in the real-time values of the one or more user parameters 105 and the one or more vehicle parameters 109 with respect to the corresponding historical values is more than a predefined optimal threshold value, the interactive assistance system 101 may intelligently predicts that an abnormal condition has occurred with respect to the user or the autonomous vehicle. In an embodiment, the value of the predefined optimal threshold may be set and/or modified by the user, as per preferences of the user. In other words, the user may change sensitivity and/or reactance level of the interactive assistance system 101 as per his/her convenience and preferences.

In an embodiment, when the interactive assistance system 101 has detected the abnormal condition, it may initiate a personalized interaction 117 with the user for analysing and/or collecting more information related to the abnormal condition from the user. In an embodiment, the personalized interaction 117 with the user may be carried out through one of an interactive assistance engine 115 selected from the set of interactive assistance engines 115 configured with the interactive assistance system 101. Selection of the right interactive assistance engine 115 may be based on nature of the abnormal condition and preferences of the user.

As an example, suppose the historical data 113 suggests that the ambient temperature in the autonomous vehicle, when the vehicle is in operation, is always maintained between 21° C. to 25° C. Suppose, the predefined optimal threshold value of ambient temperature is set to 28° C. As an example, when the real-time ambient temperature, monitored by the interactive assistance system 101, indicates that the current ambient temperature in the autonomous vehicle is 30° C., the interactive assistance system 101 determines that there is a deviation in the value of the ambient temperature. Further, since the deviated ambient temperature has crossed the predefined optimal threshold limit of 28° C., the interactive assistance system 101 considers the current situation to be an abnormal condition and initiates a personalized interaction 117 with the user to assess the abnormal condition. For example, during the interaction with the user, the interactive assistance system 101 may ask the user whether the user has intentionally turned off an Air Conditioning (AC) system in the autonomous vehicle or the AC system has gone down due to a failure in the vehicle operation. Further, based on the outcome of the personalized interaction 117, that is, based on a confirmation and/or a positive acknowledgement received from the user, the interactive assistance system 101 decides one or more assistive activities 119 that need to be performed for handling the abnormal condition.

Considering the above example, if the user confirms that the AC system has gone down on its own, the interactive assistance system 101 may perform assistive activities 119 such as checking engine temperature of the vehicle, checking coolant level in the vehicle, alerting the user and even pulling over the vehicle or shutting off the engine, opening the vehicle windows, etc. when the ambient temperature increases significantly over the optimal threshold value. On the other hand, if the user responds negatively and/or confirms that the AC system was turned off intentionally, the interactive assistance system 101 may not perform any assistive activities 119 and instead, update the relevant information on the database 111 for learning and future reference. Thus, the interactive assistance system 101 ensures safety and comfort of the user by automatically performing required assistive activities 119 based on minimum voice input/confirmation received from the user.

Figure 2:
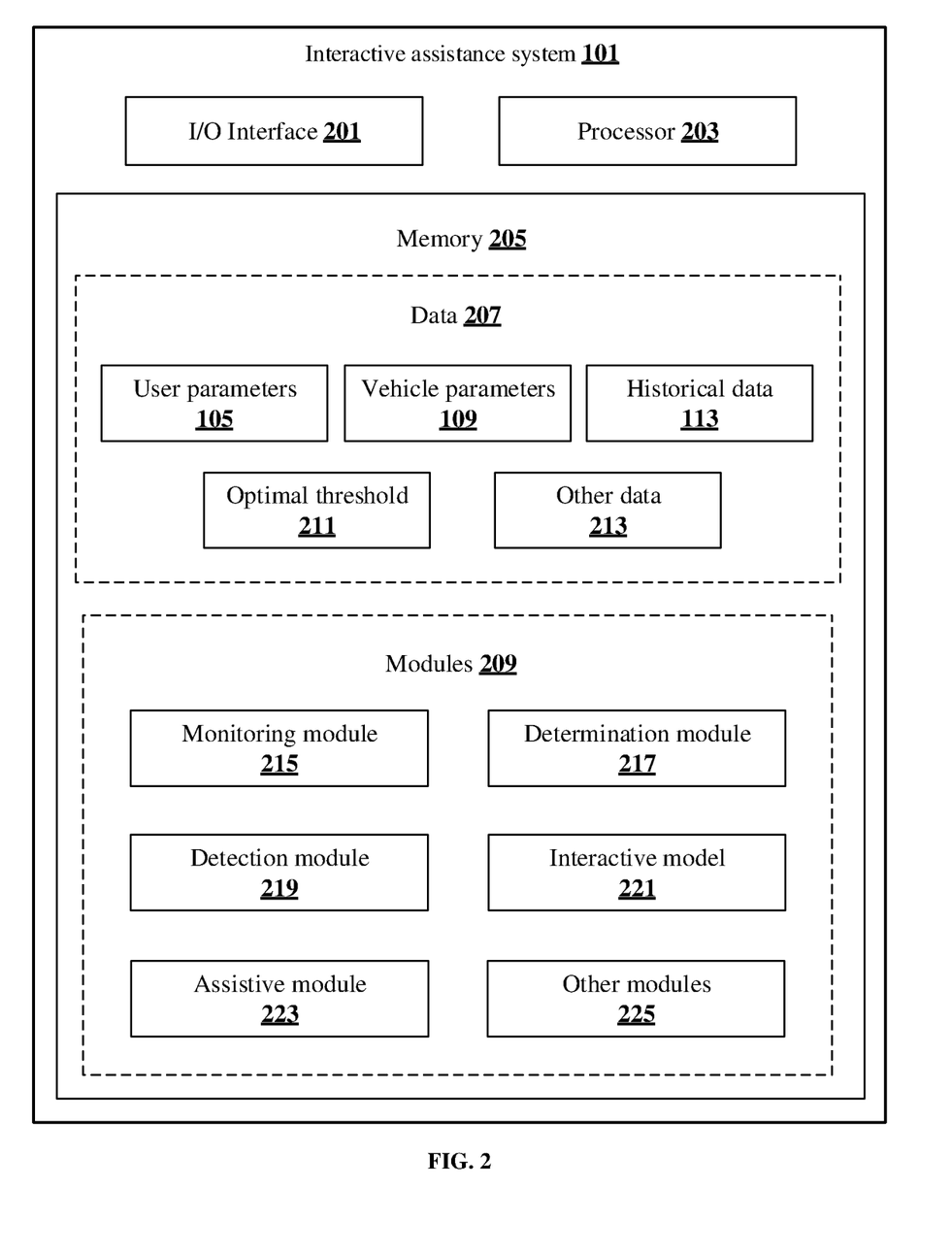
FIG. 2 shows a detailed block diagram of an interactive assistance system in accordance with some embodiments of the present disclosure.

FIG. 2 shows a detailed block diagram of an interactive assistance system 101 in accordance with some embodiments of the present disclosure.

In some implementations, the interactive assistance system 101 may include an I/O interface 201, a processor 203 and a memory 205. The I/O interface 201 may be communicatively interfaced with the monitoring unit 102 for collecting and monitoring one or more user parameters 105 and one or more vehicle parameters 109 during journey of the autonomous vehicle. Further, the I/O interface 201 may be interfaced with a database 111 for receiving historical data 113 related to the user and the autonomous vehicle. The memory 205 may be communicatively coupled to the processor 203 and may store data 207 and one or more modules 209. The processor 203 may be configured to perform one or more functions of the interactive assistance system 101 for providing personalized interactive assistance in the autonomous vehicle, using the data 207 and the one or more modules 209.

In an embodiment, the data 207 stored in the memory 209 may include, without limitation, the one or more user parameters 105, the one or more vehicle parameters 109, the historical data 113 retrieved from the database 111, an optimal threshold 211 value and other data 213. In some implementations, the data 207 may be stored within the memory 205 in the form of various data structures. Additionally, the data 207 may be organized using data models, such as relational or hierarchical data models. The other data 213 may include various temporary data and files generated by the one or more modules 209 while performing various functions of the interactive assistance system 101.

In an embodiment, the one or more user parameters 105 are the parameters related to the user and/or a passenger of the autonomous vehicle. As an example, the one or more user parameters 105 may be collected using one or more image capturing devices 103 and one or more sensors 107 configured in the autonomous vehicle. The one or more user parameters 105 may include, without limiting to, an eyeblink rate of the user, steering grip pressure exerted by the user, movement of hand, body and head of the user, body temperature, blood pressure, breathing pattern and other essential health parameters related to the user.

In an embodiment, the one or more vehicle parameters 109 may be the parameters related to functioning and maintenance of the autonomous vehicle. That is, the one or more vehicle parameters 109 indicate status of the autonomous vehicle while the autonomous vehicle is navigating. As an example, the one or more vehicle parameters 109 may include, without limiting to, value of engine temperature, fuel level, ambient temperature, tyre health status and one or more critical engine parameters associated with the autonomous vehicle.

In an embodiment, the historical data 113 may include historical values of the one or more user parameters 105 and the one or more vehicle parameters 109 collected and stored in the database 111 associated with the interactive assistance system 101. The historical data 113 may be used for determining a deviation in the real-time values of the one or more user parameters 105 and the one or more vehicle parameters 109. Further, the historical data 113 may be used for training the neural network model used for detecting the abnormal condition in the user or the autonomous vehicle.

In an embodiment, the predefined optimal threshold 211 may be an optimal value of each of the one or more user parameters 105 and each of the one or more vehicle parameters 109, which needs to be maintained for ensuring a safe and convenient journey on the autonomous vehicle. In other words, the predefined optimal threshold 211 values of each of the one or more user parameters 105 and each of the one or more vehicle parameters 109 indicates a maximum deviation that may be allowed while the autonomous vehicle is navigating. In an embodiment, the optimal threshold 211 values of all the parameters may be set by a manufacturer of the autonomous vehicle and may be dynamically modified based on preferences of the user.

In an embodiment, the data 207 may be processed by the one or more modules 209 of the interactive assistance system 101. In some implementations, the one or more modules 209 may be communicatively coupled to the processor 203 for performing one or more functions of the interactive assistance system 101. In an implementation, the one or more modules 209 may include, without limiting to, a monitoring module 215, a determination module 217, a detection module 219, an interactive module 221, an assistive module 223 and other modules 225.

As used herein, the term module may refer to an Application Specific Integrated Circuit (ASIC), an electronic circuit, a hardware processor (shared, dedicated, or group) and memory that execute one or more software or firmware programs, a combinational logic circuit, and/or other suitable components that provide the described functionality. In an implementation, each of the one or more modules 209 may be configured as stand-alone hardware computing units. In an embodiment, the other modules 225 may be used to perform various miscellaneous functionalities of the interactive assistance system 101. It will be appreciated that such one or more modules 209 may be represented as a single module or a combination of different modules.

In an embodiment, the monitoring module 215 may be configured for monitoring the one or more user parameters 105 and the one or more vehicle parameters 109 using the monitoring unit 102 associated with the interactive assistance system 101. In an embodiment, the monitoring module 215 may be initialized on ignition of the autonomous vehicle. Once initialized, the monitoring module 215 may check input and status of an inbuilt infotainment system of the autonomous vehicle to collect information related to all external inputs synched with the infotainment system. Also, basic medical/health details of the user may be fetched to monitor any change in the health of the user. The historical data 113, already stored in the database 111 may be synchronized with the interactive assistance system 101 for determining any deviation in the values of the one or more user parameters 105 and the one or more vehicle parameters 109.

In an embodiment, the input parameters monitored and collected by the monitoring module 215 may be categorized into following categories—sensor data, in-vehicle infotainment data, data from the image capturing devices 103 and health profile of the user. In an embodiment, the sensor data may include data collected from the one or more in-built sensors 107 and may include information such as eye-blink rate, steering grip pressure of the user or a sudden change in speed of the car. The data collected from the in-vehicle infotainment system may include in-vehicle parameters 109 such as temperature, current location of the autonomous vehicle and the like. Similarly, the input from the image capturing devices/cameras 103 may include user's behavioral information such as any unusual changes in the facial expressions of the user, rate of eye blink, irregular movement in the head or neck of the user, over sweating or breathlessness, abnormal coughing or sneezing and the like. Further, the health profile of the user may include medical data that is already stored with the interactive assistance system 101 or stored as a part of the historical data 113. The user's health profile may be fetched using a relevant medical identifier (ID) of the user. As an example, the health profile of the user may indicate vital information such as any past record of cardiac issue, chronic high blood pressure or a history of suffering from Asthma. All the above parameters related to the user and the autonomous vehicle are constantly monitored while the autonomous vehicle is navigating.

In an embodiment, the determination module 217 may be configured for determining a deviation in at least one of the one or more user parameters 105 and the one or more vehicle parameters 109. In an embodiment, the determination module 217 may keep a track of the real-time values of the one or more user parameters 105 and the one or more vehicle parameters 109 and may constantly compare the real-time values with the historical data 113. In case any deviation is observed in any of the parameters, say for example, the eye blink rate, abnormal breathing pattern or sweating of the user, the determination module 217 determines that a deviation has occurred.

In an embodiment, to be able to constantly analyse changes in the values of the one or more user parameters 105 and the one or more vehicle parameters 109, the determination module 217 may need to be connected with the database 111 for a constant access of the historical data 113. That is, based on the current parameter values, the historical data 113 and the pre-stored profile information of the user, the determination module 217 determines the deviation in the values of the parameters. As an example, the current sensor values and current camera feed may be used to analyse the parameters such as head movement, pupil dilation, eye blinking rate for detecting whether the user is feeling drowsy or sick. Similarly, the parameters such as motion of the hands, pressure on the steering wheel, that is, how firm or loose the grip is, may be used to determine the health condition of the user. Also, a medical history of the user may be used to analyse parameters such as sweating rate and food/liquid consumption during the journey, so that an appropriate alarm may be raised at the right instance. Similarly, unnatural motion of the head or the hand may indicate uneasiness or drowsiness or a possibility that the user is on a phone call or talking to some other passenger in the vehicle. In these complex situations, the determination module 217 may take additional inputs such as driving hour, AC temperature, kind of music being played, number of passengers in the vehicle and the like, from the in-vehicle infotainment module to confirm the health condition of the user. After a cumulative assessment of all the available information is performed, if any situation is determined as a deviation from the normal behaviour of the user or a condition which would not be ideal for the driver or the passengers in the vehicle, the determination module 217 may flag such a condition as a deviation. The above observation may be also updated on the historical data 113 for future references.

In an embodiment, the detection module 219 may be configured for detecting an abnormal condition when the deviation in at least one of the one or more user parameters 105 and the one or more vehicle parameters 109 is more than a predefined optimal threshold 211. As an example, the predefined optimal threshold 211 for a parameter may be set to 10% of the normal value of the parameter. As an example, when the deviation is higher than 10%, the detection module 219 may self-initiate an alert including probable inputs that indicate one or more factors causing the deviation in the value of the parameter. In other words, the alert from the detection module 219 may trigger the start of the personalized interaction with the user.

In an embodiment, the interactive module 221 may be configured for selecting an interactive assistance engine 115 from the set of interactive assistance engines 115 configured with the interactive assistance system 101 and for initiating a personalized interaction with the user upon detecting the abnormal condition. In an embodiment, the interactive module 221 may use a trained neural network consisting of various voice engines for carrying out the personalized interaction with the user. The voice engines used by the interactive module 221 may include, without limiting to, in-vehicle voice assistance tools such as Nuance®, Alexa® and personalized voice engines like Siri®, Cortana® and Google Assistant®. In an embodiment, multiple voice engines, as stated above, may be maintained in the interactive module 221 with an objective of having a combination of the voice engines that supports all possible kinds of voice interactions that a user may have from the autonomous vehicle. This feature is an integral part of the personalized voice support.

In an embodiment, as soon as a deviation is determined, the interactive module 221 may activate the neural network. Further, the deviating parameters and the associated values are passed on to the neural network for identifying an interactive assistance engine 115 that best suits the type of the deviation identified. In an embodiment, the neural network may identify the best-match interactive assistance engine 115 by analysing a predefined command set of all the interactive voice engines configured on the interactive assistance system 101. The best-match interactive assistance engine 115 identified by the neural network may be selected and loaded on to the in-vehicle infotainment system to carry out the personalized interaction with the user.

Most of the existing voice assistance engines get initiated when the user utters a predefined keyword or a specific command. However, since one of the objectives of the present disclosure is to have a self-initiated voice assistance support, the activation of the best-match interactive assistance engine 115 in the present disclosure is performed using the neural network, without any user intervention. In an embodiment, the neural network may not only initiate the interactive assistance engine 115, but also provide a suitable phrase, which needs to be prompted to the user according to current situation of the user. In case the user provides some other command or responds negatively to the phrase prompted by the interactive assistance engine 115, the generated phrase may be considered wrong and the prediction is treated as a failure. Since the response and/or the acknowledgement from the user is important for further processing, the interactive assistance engine 115 may get into "Listener" mode for carefully capturing the user response provided by the user. The series of actions that take place during the personalized interaction are summarized in the following steps.

```
Steps {
    Input: User response to the phrase prompted by the voice engine.
    Output: Success or Failure to provide a proper solution
        Step 1: Play or Prompt the neural network provided phrase to the user
        Step 2: Wait for user response
        Step 3: If there is NO user response:
            Step 3.1: Send the notification to the neural network to re-analyse the
            overall situation, as it may be critical and that is why the user is not been
            responding.
        Step 4: If there is a user response:
            Step 4.1: If the user response contains negative words, it may mean that the
            solution provided is not correct.
                Step 4.1.1: The voice engine needs to send the response back to the
                neural network as a 'failure case' and use that as the feedback.
            Step 4.2: If the user response contains a positive acknowledgement or
            agreement with the solution, it means that the abnormal condition is
            correctly diagnosed.
                Step 4.2.1: The voice engine needs to send the response back to the
                neural network as a 'success case' and wait for the next actions to
                be performed.
}
```

In an embodiment, the assistive module 223 may be configured for performing one or more assistive activities 119 for handling the abnormal condition detected in the autonomous vehicle and/or the user. In an embodiment, the assistive module 223 initiates the one or more assistive activities 119 only when a positive acknowledgement is received from the user. That is, when the system generated voice command is acknowledged positively by the user, it means that the interactive assistance system 101 has detected the abnormal condition correctly and it can proceed further to get a probable solution to that abnormal condition. In an embodiment, the solution and/or the assistive measure for handling the abnormal condition may be performed from within the autonomous vehicle or may be external to the autonomous vehicle.

As an example, the in-vehicle assistive activity may be performed in the following manner Suppose it is heavily raining outside and the user gets into the vehicle fully drenched out. It may take some time for the neural network to learn the current user preferences and understand the situations. Once analysis done, the neural network may provide the exact solution as per the user profile. As an example, the neural network may select Nuance® assistive interaction engine and may initiate a personalized interaction with the user by prompting the user with the phrase—"It is raining outside and it seems you are not well. Should I set the blower high, turn on the seat heater and lower the AC?". Since the proposed assistive action matches with the current requirement of the user, the user may respond with a positive acknowledgment like—"Yes please, the would be perfect". With the positive acknowledgement from the user, the assistive module 223 automatically sets the blower high, turns on the seat heater and reduces the AC. Likewise, the interactive assistance system 101 addresses the abnormal conditions with the help of a minimal positive acknowledgement from the user.

Since all the abnormal conditions cannot be resolved within the autonomous car, the assistive module 223 may also be equipped to perform one or more assistive activities 119 externally. In such scenarios, the assistive module 223 may initiate an appropriate action such as auto navigating the autonomous vehicle to a "nearby" solution centre. Here, the assistive module 223 may interact with the navigation system of the autonomous vehicle to navigate the autonomous vehicle to a predefined "nearby" location. In an embodiment, after receiving the positive acknowledgement from the user, the neural network decides the nearby location for navigating the autonomous vehicle based on the nature and context of the abnormal condition. As an example, the nearby location may be a medical shop, hospital, garage, and the like. With the instruction from the neural network, the navigation module may search for the required nearby location and find out the results. As the issue may be an urgent situation to the user, the navigation module may filter the results to find out the closest destinations or the results may be sorted as per the distance. From the results obtained by the navigation module, the interactive assistance engine 115 may select a topmost element of the result/sorted list of locations and suggest the user to take a detour to the selected location. That is, the output from the navigation module may be shown and prompted to the user for a confirmation, before changing the route of the active journey.

In an embodiment, when a place which is of personal preference to the user is not listed in the output of the navigation module, the interactive assistance engine 115 may readily accept the user input and accordingly instruct the navigation module to look for the location suggested by the user. Only after the receiving a positive acknowledgement from the user, the interactive assistance engine 115 may instruct the navigation module to set the destination as the new location. The set of actions performed by the interactive assistance system 101 for deciding a right assistive activity for addressing the abnormal condition may be summarized as following.

```
Steps {
    Input: User's confirmation on the abnormal condition detected and is considered to be not
    solvable by the in-vehicle assistive activities 119.
    Output: Destination set to 'nearby' solution centre
    Step 1: Neural network receives response as the issue is not solvable by the In-Vehicle
    Infotainment (IVI) system.
    Step 2: Neural network provides keywords to the navigation module to search for 'nearby'
    solution centres.
    Step 3: Navigation module needs to sort the obtained results as per distance to track the
``` nearest solution centre.
Step 4: Interactive assistance engine asks for user's confirmation to re-set the destination to a first element in the results obtained by the navigation module.
    Step 4.1: If the user response contains 'negative sentiment', it means that there may be some other solution centre which is of user's choice.
        Step 4.1.1: Interactive assistance engine sends the response back to the neural network as a 'failure case' and uses that as a feedback.
        Step 4.1.2: Interactive assistance engine switches to the 'listener mode' to get the user input on the preferred solution centre.
    Step 4.2: If the user response contains 'positive sentiment' with the solution,
        Stem 4.2.1: Interactive assistance engine sends the response back to the neural network as a 'success case'.
        Step 4.2.2: The navigation module modifies the active route and takes a detour to the solution centre preferred by the user immediately.
}

In an embodiment, information such as the determined deviation in the values of the parameters, the detected abnormal condition and the assistive activity performed to address the abnormal condition may be stored the database 111, which serves as historical data 113 for future processing by the interactive assistance system 101. This helps the interactive assistance system 101 to become more efficient with the enriched data set and make accurate decisions regarding the assistive activities 119, thereby reducing the total processing time of the interactive assistance system 101.

Figure 3:
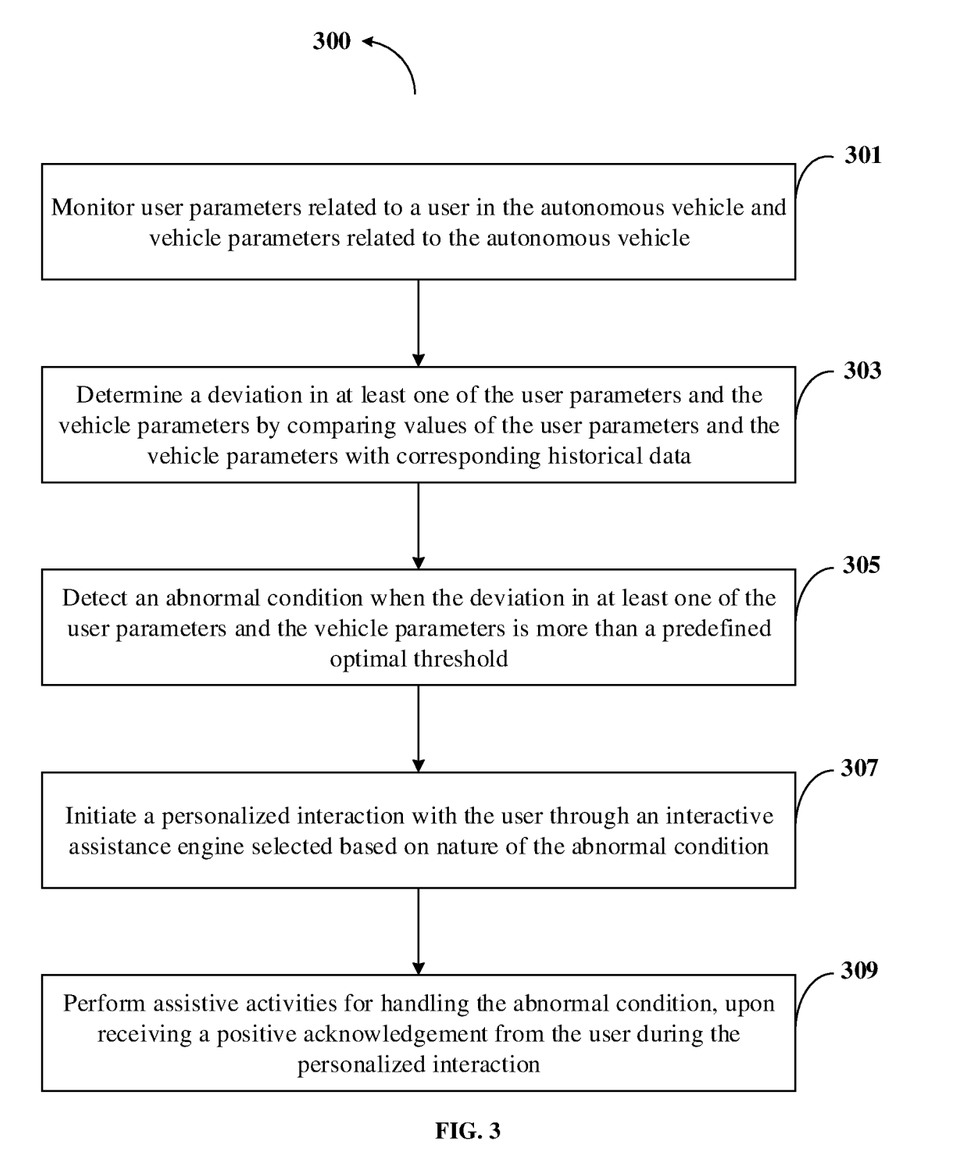
FIG. 3 shows a flowchart illustrating a method of providing personalized interactive assistance in an autonomous vehicle in accordance with some embodiments of the present disclosure.

FIG. 3 shows a flowchart illustrating a method of providing personalized interactive assistance in an autonomous vehicle in accordance with some embodiments of the present disclosure.

As illustrated in FIG. 3, the method 300 may include one or more blocks illustrating a method for providing personalized interactive assistance in an autonomous vehicle using an interactive assistance system 101 illustrated in FIG. 1. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the method 300 includes monitoring, by the interactive assistance system 101, one or more user parameters 105 related to a user in the autonomous vehicle and one or more vehicle parameters 109 related to the autonomous vehicle. As an example, the one or more user parameters 105 may include, without limiting to, at least one of eyeblink rate, steering grip pressure, hand movement, body temperature, blood pressure, head movement, breathing pattern and other essential health parameters related to the user. Similarly, the one or more vehicle parameters 109 may include, without limiting to, at least one of engine temperature, fuel level, ambient temperature, tyre health status and one or more critical engine parameters associated with the autonomous vehicle. In an implementation, the one or more user parameters 105 and the one or more vehicle parameters 109 may be monitored using one or more sensors 107 configured in the autonomous vehicle, inputs from one or more in-vehicle cameras and a predefined health profile of the user.

At block 303, the method 300 includes determining, by the interactive assistance system 101, a deviation in at least one of the one or more user parameters 105 and the one or more vehicle parameters 109 by comparing values of the one or more user parameters 105 and the one or more vehicle parameters 109 with corresponding historical data 113. In an embodiment, the historical data 113 may be retrieved from a database 111 associated with the interactive assistance system 101.

At block 305, the method 300 includes detecting, by the interactive assistance system 101, an abnormal condition when the deviation in at least one of the one or more user parameters 105 and the one or more vehicle parameters 109 is more than a predefined optimal threshold 211. In an embodiment, the predefined optimal threshold 211 may be changed and/or modified as per requirements of the user of the autonomous vehicle.

At block 307, the method 300 includes initiating, by the interactive assistance system 101, a personalized interaction with the user upon detecting the abnormal condition. In an embodiment, the personalized interaction may be carried out through an interactive assistance engine 115 selected based on nature of the abnormal condition. In an embodiment, selecting the interactive assistance engine 115 may include comparing information related to the abnormal condition with information associated with one or more interactive assistance engines 115 configured in the interactive assistance system 101 and selecting one of the one or more interactive assistance engines 115, having highest relevance to the abnormal condition, for carrying out the personalized interaction with the user. In an implementation, each of one or more interactive assistance engines 115 configured in the autonomous vehicle may be updated with outcome of the personalized interaction so that each of the one or more interactive assistance engines 115 learn and become more relevant for future use.

At block 309, the method 300 includes performing, by the interactive assistance system 101, one or more assistive activities 119 for handling the abnormal condition, upon receiving a positive acknowledgement from the user during the personalized interaction. In an embodiment, the positive acknowledgement received from the user may include minimum information required for confirming the abnormal condition. Further, detecting the abnormal condition and selecting the interactive assistance engine 115 corresponding to the abnormal condition may be performed using a pretrained neural network associated with the interactive assistance system 101. As an example, the one or more assistive activities 119 may include, without limiting to, at least one of re-routing the autonomous vehicle to a nearest predefined location based on user confirmation, instructing the user to perform one or more actions, and altering the one or more vehicle parameters 109. In an embodiment, when the user makes a negative acknowledgement and/or responds negatively during the personalized interaction 117, the interactive assistance system 101 considers the prediction and/or detection of the abnormal event to be incorrect and updates the interactive assistance engine 115 and the database 111 accordingly.

Computer System

Figure 4:
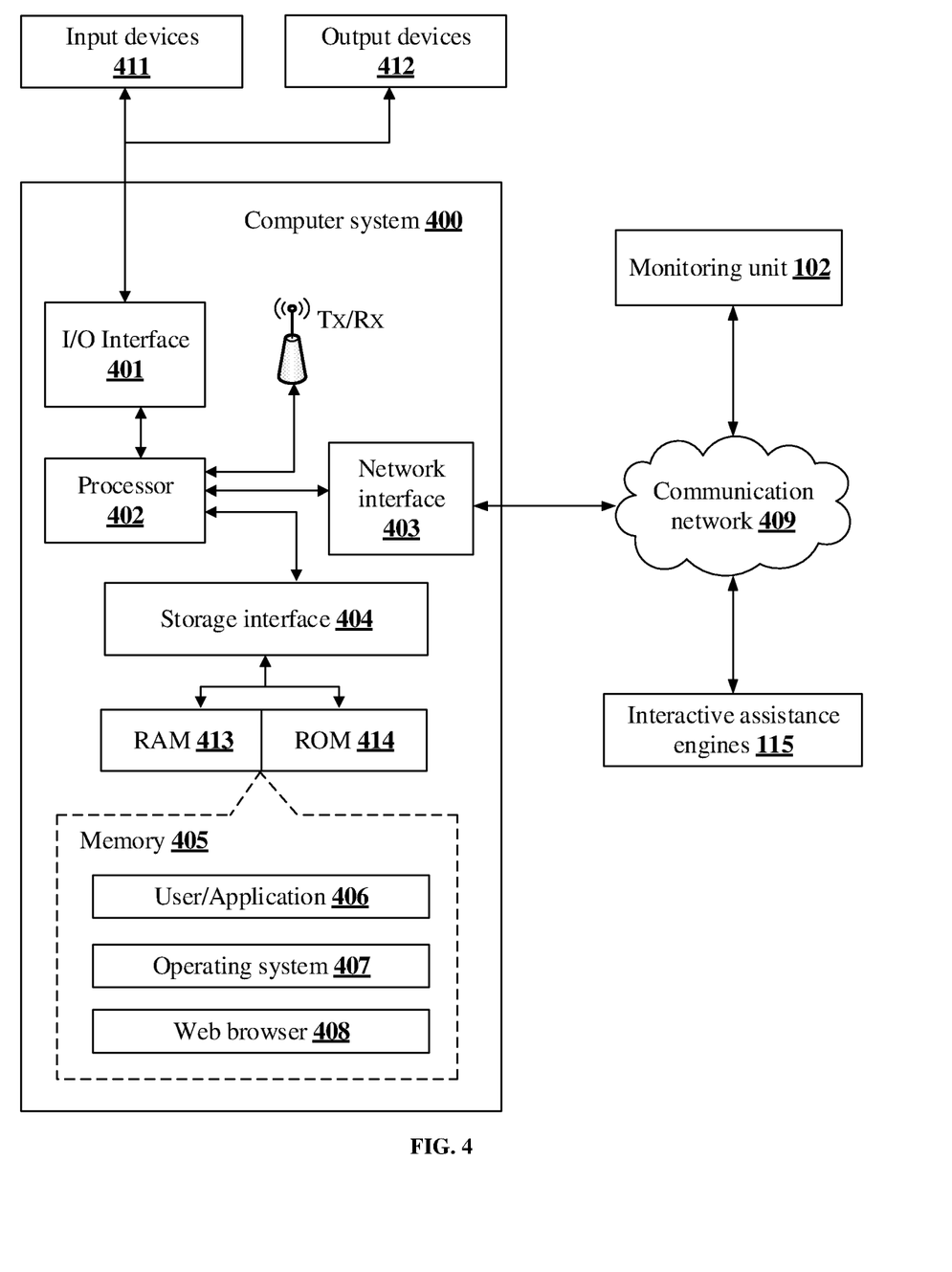
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be the interactive assistance system 101 illustrated in FIG. 1, which may be used for providing personalized interactive assistance in an autonomous vehicle. The computer system 400 may include a central processing unit ("CPU" or "processor") 402. The processor 402 may comprise at least one data processor for executing program components for executing user- or system-generated business processes. A user may include a driver of the autonomous vehicle, a passenger or any system/sub-system being operated parallelly to the computer system 400. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE®-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE® 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 411 and 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc. Using the network interface 403 and the communication network 409, the computer system 400 may communicate with a monitoring unit 102, comprising one or more image capturing units 103 and one or more sensors 107, for retrieving and monitoring one or more user parameters 105 and one or more vehicle parameters 109. Additionally, the computer system 400 may establish connection with one or more interactive assistance engines 115 to be selected and used for initiating the personalized interaction with the user.

In an implementation, the communication network 409 may be implemented as one of the several types of networks, such as intranet or Local Area Network (LAN) and such within the organization. The communication network 409 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application interface 406, an operating system 407, a web browser 408, and the like. In some embodiments, computer system 400 may store user/application data 406, such as the data, variables, records, etc. as described in this invention. Such databases may be implemented as fault-tolerant, relational, scalable, secure databases such as Oracle® or Sybase®.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA/7/8, 10 etc.), APPLE® IOS®, GOOGLE™ ANDROID™, BLACKBERRY® OS, or the like.

The user interface 406 may facilitate display, execution, interaction, manipulation, or operation of program components through textual or graphical facilities. For example, the user interface 406 may provide computer interaction interface elements on a display system operatively connected to the computer system 400, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX®, JAVA®, JAVASCRIPT®, AJAX, HTML, ADOBE® FLASH®, etc.), or the like.

The web browser 408 may be a hypertext viewing application. Secure web browsing may be provided using Secure Hypertext Transport Protocol (HTTPS), Secure Sockets Layer (SSL), Transport Layer Security (TLS), and the like. The web browsers 408 may utilize facilities such as AJAX, DHTML, ADOBE® FLASH®, JAVASCRIPT®, JAVA®, Application Programming Interfaces (APIs), and the like. Further, the computer system 400 may implement a mail server stored program component. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOB- JECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the embodiments of the present disclosure are illustrated herein.

In an embodiment, the present disclosure discloses an interactive assistance system capable of carrying out a personalized interaction with a user or a driver of the autonomous vehicle while driving.

In an embodiment, the interactive assistance system of the present disclosure provides a personalized assistance to the user/driver of the autonomous vehicle when the user/driver faces an abnormal condition such as a heath issue or an emergency situation.

In an embodiment, the interactive assistance system of the present disclosure requires only minimal intervention/inputs from the user/driver of the autonomous vehicle for performing one or more assistive activities to handle the abnormal condition.

In an embodiment, the interactive assistance system of the present disclosure intelligently selects a best interactive assistance engine, among the multiple interactive assistance engines configured in the interactive assistance system, based on situation and nature of the abnormal condition, thereby making the interaction session more effective to the user/driver.

The method and system disclosed in the present disclosure may be used to overcome various technical problems related to predictive user/driver assistance in the autonomous vehicles. Specifically, the method and system disclosed herein aim to enhance safety and convenience of the driver and/or user of the autonomous vehicle during a journey. In other words, the disclosed method and the system have a practical application and provide a technically advanced solution to the technical problems associated with the autonomous vehicles like autonomous cars.

The aforesaid technical advancement and practical application of the disclosed method and system may be attributed to the aspect of a) detecting an abnormal condition during the journey b) initiating a personalized interaction with the user through a selected one of the interactive assistance engine and c) performing one or more assistive activities with minimum user intervention for handling the abnormal condition, as disclosed in steps 3-5 of the independent claims 1 and 10 of the disclosure.

In light of the technical advancements provided by the disclosed method and system, the claimed steps, as discussed above, are not routine, conventional, or well-known aspects in the art, as the claimed steps provide the aforesaid solutions to the technical problems existing in the conventional technologies. Further, the claimed steps clearly bring an improvement in the functioning of the system itself, as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device/article is described herein (whether they cooperate), it will be clear that a single device/article may be used in place of the more than one device/article or a different number of devices/articles may be used instead of the shown number of devices or programs. The functionality and/or features of a device may be alternatively embodied by one or more other devices which are not explicitly described as having such functionality/features. Thus, other embodiments of invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral Numerals: | |
|---|---|
| Reference Number | Description |
| 100 | Environment |
| 101 | Interactive assistance system |
| 102 | Monitoring unit |
| 103 | Image capturing devices |

-continued

| Reference Number | Description |
| --- | --- |
| 105 | User parameters |
| 107 | Sensors |
| 108 | Voice modules |
| 109 | Vehicle parameters |
| 111 | Database |
| 113 | Historical data |
| 115 | Interactive assistance engines |
| 117 | Personalized user interaction |
| 119 | Assistive activities |
| 201 | I/O Interface |
| 203 | Processor |
| 205 | Memory |
| 207 | Data |
| 209 | Modules |
| 211 | Optimal threshold |
| 213 | Other data |
| 215 | Monitoring module |
| 217 | Determination module |
| 219 | Detection module |
| 221 | Interactive module |
| 223 | Assistive module |
| 225 | Other modules |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User/Application |
| 407 | Operating system |
| 408 | Web browser |
| 409 | Communication network |
| 411 | Input devices |
| 412 | Output devices |
| 413 | RAM |
| 414 | ROM |

What is claimed is:

1. A method of providing personalized interactive assistance in an autonomous vehicle, the method comprising:
monitoring, by an interactive assistance system, one or more user parameters related to a user in the autonomous vehicle and one or more vehicle parameters related to the autonomous vehicle;
determining, by the interactive assistance system, a deviation in at least one of the one or more user parameters and the one or more vehicle parameters by comparing values of the one or more user parameters and the one or more vehicle parameters with corresponding historical data;
detecting, by the interactive assistance system, an abnormal condition when the deviation in at least one of the one or more user parameters and the one or more vehicle parameters is more than a predefined optimal threshold;
initiating, by the interactive assistance system, a personalized interaction with the user, upon detecting the abnormal condition, through an interactive assistance engine selected based on nature of the abnormal condition, and wherein the interactive assistance engine is further selected, without any user intervention, using a pretrained neural network that analyses a predefined command set of a plurality of interactive voice engines configured on the interactive assistance system; and
performing, by the interactive assistance system, one or more assistive activities for handling the abnormal condition, upon receiving a positive acknowledgement from the user during the personalized interaction.

2. The method as claimed in claim 1, wherein the one or more user parameters comprise at least one of eyeblink rate, steering grip pressure, hand movement, body temperature, blood pressure, head movement, breathing pattern and other essential health parameters related to the user.

3. The method as claimed in claim 1, wherein the one or more vehicle parameters comprise at least one of engine temperature, fuel level, ambient temperature, tyre health status and one or more critical engine parameters associated with the autonomous vehicle.

4. The method as claimed in claim 1, wherein the one or more user parameters and the one or more vehicle parameters are monitored using one or more sensors configured in the autonomous vehicle, inputs from one or more in-vehicle cameras and a predefined health profile of the user.

5. The method as claimed in claim 1, wherein selecting the interactive assistance engine comprises:
comparing information related to the abnormal condition with information associated with one or more interactive assistance engines configured in the interactive assistance system; and
selecting, based on comparison, one of the one or more interactive assistance engines having highest relevance to the abnormal condition for conducting the personalized interaction with the user.

6. The method as claimed in claim 1 further comprises updating each of one or more interactive assistance engines configured in the autonomous vehicle with outcome of the personalized interaction.

7. The method as claimed in claim 1, wherein the positive acknowledgement received from the user comprises minimum information required for confirming the abnormal condition.

8. The method as claimed in claim 1, wherein detecting the abnormal condition and selecting the interactive assistance engine corresponding to the abnormal condition are performed using the pretrained neural network associated with the interactive assistance system.

9. The method as claimed in claim 1, wherein the one or more assistive activities comprise at least one of re-routing the autonomous vehicle to a nearest predefined location based on user confirmation, instructing the user to perform one or more actions, and altering the one or more vehicle parameters.

10. An interactive assistance system for providing personalized interactive assistance in an autonomous vehicle, the interactive assistance system comprising:
a processor; and
a memory, communicatively coupled to the processor, wherein the memory stores processor-executable instructions, which on execution, cause the processor to:
monitor one or more user parameters related to a user in the autonomous vehicle and one or more vehicle parameters related to the autonomous vehicle;
determine a deviation in at least one of the one or more user parameters and the one or more vehicle parameters by comparing values of the one or more user parameters and the one or more vehicle parameters with corresponding historical data;
detect an abnormal condition when the deviation in at least one of the one or more user parameters and the one or more vehicle parameters is more than a predefined optimal threshold;
initiate a personalized interaction with the user, upon detecting the abnormal condition, through an interactive assistance engine selected based on nature of the abnormal condition, and wherein the interactive assistance engine is further selected, without any user intervention, using a pretrained neural network that analyses a predefined command set of a plurality of interactive voice engines configured on the interactive assistance system; and perform one or more assistive activities for handling the abnormal condition, upon receiving a positive acknowledgement from the user during the personalized interaction.

11. The interactive assistance system as claimed in claim 10, wherein the one or more user parameters comprise at least one of eyeblink rate, steering grip pressure, hand movement, body temperature, blood pressure, head movement, breathing pattern and other essential health parameters related to the user.

12. The interactive assistance system as claimed in claim 10, wherein the one or more vehicle parameters comprise at least one of engine temperature, fuel level, ambient temperature, tyre health status and one or more critical engine parameters associated with the autonomous vehicle.

13. The interactive assistance system as claimed in claim 10, wherein the processor monitors the one or more user parameters and the one or more vehicle parameters using one or more sensors configured in the autonomous vehicle, camera inputs from one or more in-vehicle cameras and a predefined health profile of the user.

14. The interactive assistance system as claimed in claim 10, wherein the processor selects the interactive assistance engine by:

comparing information related to the abnormal condition with information associated with one or more interactive assistance engines configured in the interactive assistance system; and selecting, based on comparison, one of the one or more interactive assistance engines having highest relevance to the abnormal condition for conducting the personalized interaction with the user.

15. The interactive assistance system as claimed in claim 10, wherein the processor is further configured to update each of one or more interactive assistance engines configured in the autonomous vehicle with outcome of the personalized interaction.

16. The interactive assistance system as claimed in claim 10, wherein the positive acknowledgement received from the user comprises minimum information required for confirming the abnormal condition.

17. The interactive assistance system as claimed in claim 10, wherein detecting the abnormal condition and selecting the interactive assistance engine corresponding to the abnormal condition are performed using the pretrained neural network associated with the interactive assistance system.

18. The interactive assistance system as claimed in claim 10, wherein the one or more assistive activities comprise at least one of re-routing the autonomous vehicle to a nearest predefined location based on user confirmation, instructing the user to perform one or more actions, and altering the one or more vehicle parameters.

19. A non-transitory computer readable medium including instructions stored thereon that when processed by at least one processor cause an interactive assistance system to perform operations comprising:

monitoring one or more user parameters related to a user in the autonomous vehicle and one or more vehicle parameters related to the autonomous vehicle;

determining a deviation in at least one of the one or more user parameters and the one or more vehicle parameters by comparing values of the one or more user parameters and the one or more vehicle parameters with corresponding historical data;

detecting an abnormal condition when the deviation in at least one of the one or more user parameters and the one or more vehicle parameters is more than a predefined optimal threshold;

initiating a personalized interaction with the user, upon detecting the abnormal condition, through an interactive assistance engine selected based on nature of the abnormal condition, and wherein the interactive assistance engine is further selected, without any user intervention, using a pretrained neural network that analyses a predefined command set of a plurality of interactive voice engines configured on the interactive assistance system; and performing one or more assistive activities for handling the abnormal condition, upon receiving a positive acknowledgement from the user during the personalized interaction.

20. The non-transitory computer readable medium as claimed in claim 19, wherein the one or more user parameters comprise at least one of eyeblink rate, steering grip pressure, hand movement, body temperature, blood pressure, head movement, breathing pattern and other essential health parameters related to the user, and wherein the one or more vehicle parameters comprise at least one of engine temperature, fuel level, ambient temperature, tyre health status and one or more critical engine parameters associated with the autonomous vehicle.

* * * * *